(12) United States Patent
Langsworth

(10) Patent No.: US 8,751,819 B1
(45) Date of Patent: Jun. 10, 2014

(54) SYSTEMS AND METHODS FOR ENCODING DATA

(75) Inventor: Anthony Langsworth, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 32 days.

(21) Appl. No.: 13/240,959

(22) Filed: Sep. 22, 2011

(51) Int. Cl.
*G06F 21/00* (2013.01)

(52) U.S. Cl.
USPC .......................................... 713/189; 380/28

(58) Field of Classification Search
None
See application file for complete search history.

(56) References Cited

U.S. PATENT DOCUMENTS

| | | | |
|---|---|---|---|
| 6,307,938 B1 * | 10/2001 | Matyas et al. | 380/44 |
| 7,095,855 B1 * | 8/2006 | Collins | 380/241 |
| 7,188,224 B2 * | 3/2007 | Ohta et al. | 711/163 |
| 7,636,439 B2 * | 12/2009 | Nakabayashi et al. | 380/46 |
| 7,876,894 B2 * | 1/2011 | Iyer et al. | 380/37 |
| 8,555,081 B2 * | 10/2013 | Chen et al. | 713/189 |
| 2002/0150241 A1 * | 10/2002 | Scheidt et al. | 380/44 |
| 2005/0074122 A1 * | 4/2005 | Fascenda | 380/258 |
| 2005/0251402 A1 * | 11/2005 | Olsen et al. | 705/1 |
| 2006/0056625 A1 * | 3/2006 | Nakabayashi et al. | 380/46 |
| 2006/0200412 A1 * | 9/2006 | Fahrny et al. | 705/50 |
| 2007/0237327 A1 * | 10/2007 | Taylor et al. | 380/37 |
| 2008/0152140 A1 * | 6/2008 | Fascenda | 380/258 |
| 2009/0113216 A1 * | 4/2009 | Chen et al. | 713/189 |
| 2010/0100946 A1 * | 4/2010 | Hallam-Baker | 726/5 |
| 2010/0169651 A1 * | 7/2010 | Scheidt | 713/176 |
| 2010/0215175 A1 * | 8/2010 | Newson et al. | 380/44 |
| 2010/0229005 A1 * | 9/2010 | Herman et al. | 713/193 |
| 2011/0228942 A1 * | 9/2011 | Fahrny et al. | 380/278 |

OTHER PUBLICATIONS

RSA Laboratories; PKCS #5 v2.1: Password-Based Cryptography Standard; Oct. 5, 2006.
RSA Laboratories; PKCS 12 v1.0; Personal Information Exchange Syntax; Jun. 24, 1999.
The Cable Guy; Wi-Fi Protected Access 2 Data Encryption and Integrity; http://technet.microsoft.com/en-us/library/bb878096.aspx; Aug. 2005.
MSDN; 2.3.4.12 Initialization Vector Generation (Agile Encryption); http://msdn.microsoft.com/en-us/library/dd943452; Taken from site on Mar. 28, 2011.
MSDN; 2.3.4.11 Encryption Key Generation (Agile Encryption); http://msdn.microsoft.com/en-us/library/dd924776; Taken from site Mar. 28, 2011.
Wikipedia; Initialization Vector; http://en.wikipedia.org/wiki/Initialization_vector; Taken from site Mar. 6, 2011.
Bruce Schneier; Schneier on Security—A blog covering security and security technology; http://www.schneier.com/blog/archives/2005/01/microsoft_rc4_f.html; Jan. 18, 2005.
Bruce Schneier; Cryptanalysis of Microsoft's Point-tp-Point Tunneling Protocol (PPTP); Counterpane Systems.

* cited by examiner

*Primary Examiner* — Michael R Vaughan
(74) *Attorney, Agent, or Firm* — ALG Intellectual Property, LLC

(57) ABSTRACT

A computer-implemented method for encoding data may include 1) receiving a request to encode the data using a cipher, 2) identifying an encryption key to be used by the cipher to encode the data, 3) generating, on a computing system, a non-random initialization vector for the cipher by identifying a unique identifier associated with the computing system, identifying information associated with the data, and concatenating the unique identifier with the information associated with the data to create the initialization vector, and 4) encoding the data with the cipher using the initialization vector and the encryption key. Various other methods, systems, and computer-readable media are also disclosed.

20 Claims, 6 Drawing Sheets

SYSTEMS AND METHODS FOR ENCODING DATA

BACKGROUND

Security solutions may store many types of sensitive information, such as passwords used to access various servers and services. Traditionally, these security solutions have protected data using symmetric encryption algorithms with a different encryption key for each piece of sensitive data (e.g., a different key for each password). As a result, the encryption key management implemented by traditional security solutions may be complex and cumbersome. Furthermore, encryption key management may grow in complexity with each new key that is added because each key may need to be protected and/or renegotiated individually.

Due to its complexity, the use of traditional encryption key management may be misdirected in some situations. For example, if the protected data is not negotiated with a third party or transmitted over a network, the robust security provided by traditional encryption key management may provide more security (and consume more computing resources) than may be necessary. Furthermore, traditional encryption key management may not be suitable in certain situations. For example, some embedded systems may lack the processing power and/or memory resources to effectively implement traditional encryption key management solutions. What is needed, therefore, is a more efficient and effective mechanism for managing encryption keys and/or encoding other data.

SUMMARY

As will be described in greater detail below, the instant disclosure generally relates to systems and methods for encoding data. In one example, a computer-implemented method for encoding data may include 1) receiving a request to encode the data using a cipher, 2) identifying an encryption key to be used by the cipher to encode the data, 3) generating, on a computing system, a non-random initialization vector for the cipher by identifying a unique identifier associated with the computing system, identifying information associated with the data, and concatenating the unique identifier with the information associated with the data to create the initialization vector, and 4) encoding the data with the cipher using the initialization vector and the encryption key.

In some embodiments, identifying the unique identifier associated with the computing system may include locating a hardware identifier associated with the computing system and computing a hash of the hardware identifier, where the hash comprises the unique identifier associated with the computing system. Additionally or alternatively, identifying the unique identifier associated with the computing system may include locating an identifier assigned to the computing system by a third party and computing a hash of the identifier assigned to the computing system by the third party, where the hash comprises the unique identifier associated with the computing system.

In some embodiments, identifying the information associated with the data may include identifying information that indicates a location of the data and computing a hash of the information that indicates the location of the data, where the hash comprises the information associated with the data.

According to certain embodiments, the non-random initialization vector may be generated such that the non-random initialization vector is free from random data and pseudo-random data.

In various embodiments, encoding the data with the cipher may include applying the initialization vector to the data to create a first encoding of the data and applying a key to the first encoding of the data to provide a second encoding of the data.

In some examples, the cipher may include a block cipher. In other examples, the cipher may include a stream cipher and encoding the data with the cipher using the initialization vector may involve seeding the stream cipher with the initialization vector.

According to certain embodiments, the computing system may include an embedded computing device that is configured to perform a set of predefined dedicated tasks. The embedded computing device may be limited by computing constraints such that the embedded computing device is incapable of generating random and/or pseudo-random data for use in initialization vectors. Alternatively, the embedded computing device may be limited by computing constraints such that generating random and/or pseudo-random data on the embedded computing device is time prohibitive.

The method may include storing the encryption key within the embedded computing device, and the embedded computing device may be limited by memory constraints such that storing the encryption key within the embedded computing device consumes a non-trivial amount of memory within the embedded computing device.

According to some examples, the method may further include 5) identifying the encryption key to be used by the cipher to encode additional data, 6) generating, on the computing system, an additional non-random initialization vector for the cipher by identifying the unique identifier associated with the computing system, identifying information associated with the additional data, and concatenating the unique identifier with the information associated with the additional data to create the additional non-random initialization vector, and 7) encoding the additional data with the cipher using the non-random initialization vector and the encryption key.

Additionally or alternatively, the method may further include 5) discarding the initialization vector, 6) after discarding the initialization vector, receiving a request to decode the data, 7) identifying the encryption key to be used to decode the data, 8) recreating the non-random initialization vector by identifying the unique identifier associated with the computing system, identifying the information associated with the data, and concatenating the unique identifier with the information associated with the data to recreate the initialization vector, and 9) decoding the data using the non-random initialization vector and the encryption key.

In one embodiment, a system for implementing the above-described method may include 1) a reception module programmed to receive a request to encode data using a cipher, 2) an identification module programmed to identify an encryption key to be used by the cipher to encode the data, 3) a generation module programmed to generate, on a computing device, a non-random initialization vector for the cipher by identifying a unique identifier associated with the computing device, identifying information associated with the data, and concatenating the unique identifier with the information associated with the data to create the initialization vector, 4) the cipher, wherein the cipher is programmed to encode the data using the initialization vector and the encryption key, and 5) at least one processor configured to execute the reception module, the identification module, the generation module, and the cipher.

In some examples, the above-described method may be encoded as computer-readable instructions on a computer-readable-storage medium. For example, the computer-readable-storage medium may include one or more computer-executable instructions that, when executed by at least one processor of a computing device, may cause the computing device to 1) receive a request to encode data using a cipher, 2) identify an encryption key to be used by the cipher to encode the data, 3) generate, on a computing system, a non-random initialization vector for the cipher by identifying a unique identifier associated with the computing system, identifying information associated with the data, and concatenating the unique identifier with the information associated with the data to create the initialization vector, and 4) encode the data with the cipher using the initialization vector and the encryption key.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
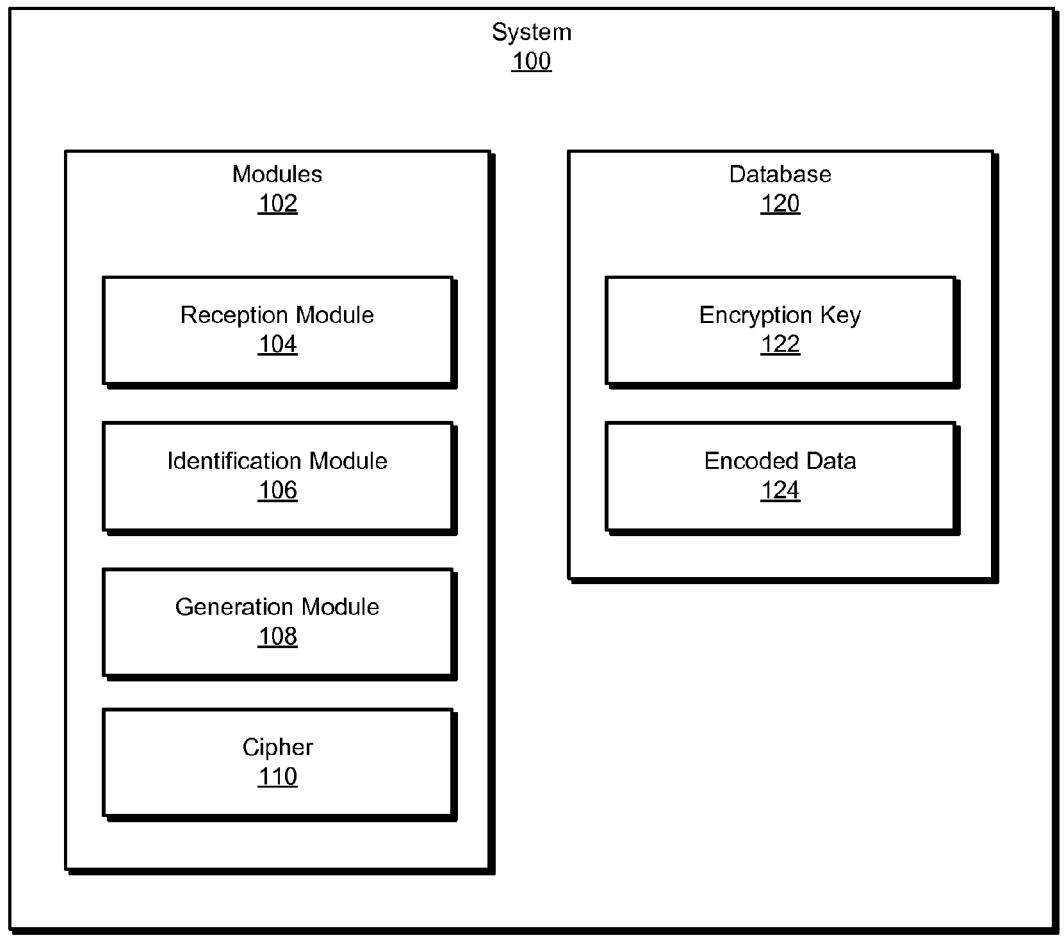
FIG. 1 is a block diagram of an exemplary system for encoding data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may use initialization vectors for encoding data in a manner that reduces or eliminates the need for encryption key management. Embodiments of the instant disclosure may also provide efficient and effective data encoding that may be used on devices with limited resources, such as embedded devices. These and other advantages and features will be more fully understood upon reading the following detailed description The following will provide, with reference to FIGS. 1, 2, and 4, detailed descriptions of exemplary systems for encoding data. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for encoding data. As illustrated in this figure, exemplary system 100 may include one or more modules 102 for performing one or more tasks. For example, and as will be explained in greater detail below, exemplary system 100 may include a reception module 104 programmed to receive a request to encode the data using a cipher. Exemplary system 100 may also include an identification module 106 programmed to identify an encryption key to be used by the cipher to encode the data.

In addition, and as will be described in greater detail below, exemplary system 100 may include a generation module 108 programmed to generate, on a computing device, a non-random initialization vector for the cipher by identifying a unique identifier associated with the computing device, identifying information associated with the data, and concatenating the unique identifier with the information associated with the data to create the initialization vector. System 100 may also include a cipher 110 programmed to encode the data using the initialization vector and the encryption key. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store an encryption key 122 and encoded data 124.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Figure 2:
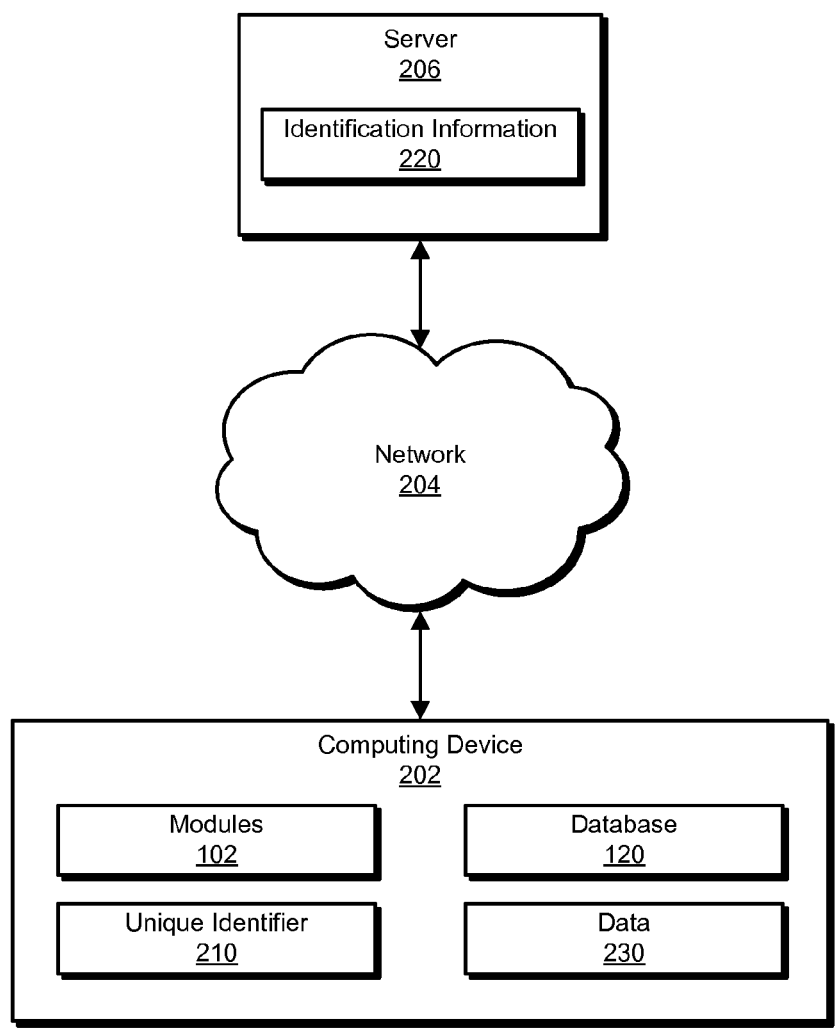
FIG. 2 is a block diagram of an exemplary system for encoding data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. A user may use computing device 202 to access server 206 via network 204. The user may need to enter authentication credentials (represented as data 230), which may include a password, a private key, and/or any other type of credential, into server 206 to access server 206.

In one embodiment, one or more of modules 102 from FIG. 1 may, when executed by at least one processor of computing device 202, enable computing device 202 to encode data. For example, modules 102 and database 120 may be located on computing device 202, and generation module 108 may use a unique identifier 210 of computing device 202 and identification information 220 associated with data 230 to encode data 230 to provide encoded data 124 (i.e., to encode the password used to access server 206).

Computing device 202 generally represents any type or form of computing device capable of reading computer-executable instructions. Examples of computing device 202 include, without limitation, laptops, desktops, servers, cellular phones, smartphones, tablet computing devices, personal digital assistants (PDAs), multimedia players, embedded systems, combinations of one or more of the same, exemplary computing system 510 in FIG. 5, or any other suitable computing device.

Server 206 generally represents any type or form of computing device that a user may attempt to access using a password or any other type of credentials. Examples of server 206 include, without limitation, application servers, database servers, web servers and/or servers, and/or any other device configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
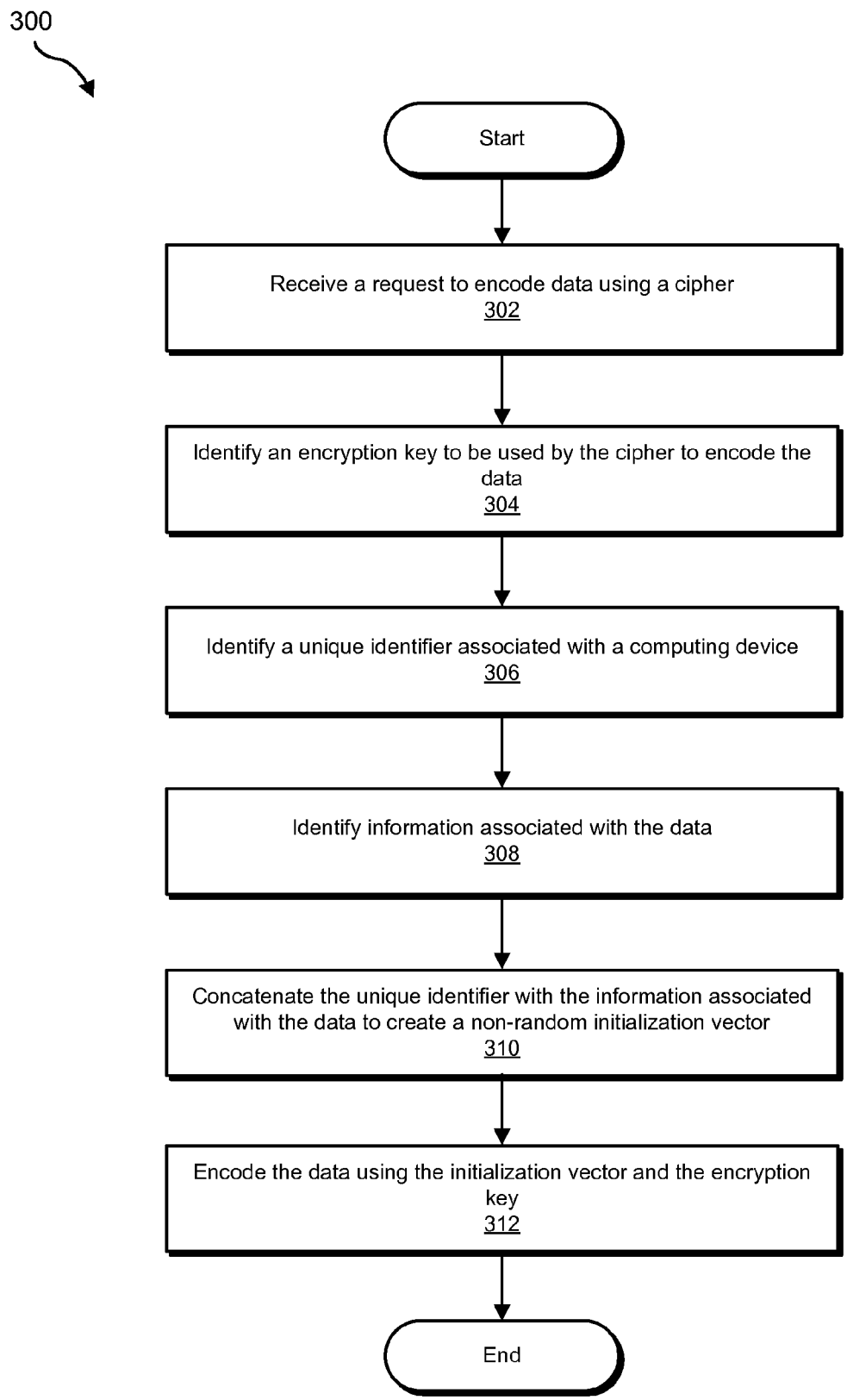
FIG. 3 is a flow diagram of an exemplary method for encoding data.

FIG. 3 is a flow diagram of an exemplary computer-implemented method 300 for encoding data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302 in FIG. 3, one or more of the systems described herein may receive a request to encode data using a cipher. For example, reception module 104 (which may, as detailed above, represent a portion of computing device 202 in FIG. 2) may receive the request to encode the data using cipher 110 on computing device 202.

Reception module 104 may receive a request to encode data in a variety of different contexts. For example, reception module 104 may be part of a password management system that stores and secures passwords for one or more users. In such embodiments, reception module 104 may receive a request to encode a password when a new password is added to the password management system, when the password management system detects the user entering in the password into a user interface field (e.g., into a web browser that provides access to server 206), and/or in a variety of other scenarios.

Reception module 104 may receive a request to encode various types of data. As noted above, reception module 104 may encode passwords. Reception module 104 may also encode various other types of security credentials (e.g., security certificates) and/or other sensitive data.

At step 304 in FIG. 3, one or more of the systems described herein may identify an encryption key to be used by the cipher to encode the data. For example, identification module 106 in FIG. 1 (which may, as detailed above, represent a portion of computing device 202 in FIG. 2) may identify encryption key 122 to be used by cipher 110 to encode data 230 on computing device 202.

As used herein, the phrase "encryption key" generally refers to any data that may be used to determine the functional output of a cipher. An encryption key may be any input parameter for a cipher. For example, an encryption key may specify a transformation of plain text into cipher text (e.g., encoded data) and/or cipher text into plain text. The encryption key may be generated using any suitable algorithm and may contain suitable entropy. Encryption keys may be of any suitable length, and may be used in symmetric-key cryptography, public-key cryptography, and/or any other type of cryptography.

As used herein, the term "cipher" generally refers to any algorithm for performing encryption and/or decryption. For example, a cipher may include a set of defined steps that can be followed as a procedure for encoding data. As discussed in greater detail below, a cipher may be a block cipher, a stream cipher, and/or any other type of cipher that uses an encryption key and an initialization vector to encode data.

Steps 306, 308, and 310 are performed in a process for generating a non-random initialization vector for the cipher to use in data encryption. As used herein, the phrase "initialization vector" generally refers to any input to a cipher that may be used in combination with an encryption key to encrypt data using the cipher. An initialization vector may initialize a cipher in one or more of a variety of ways. For example, in a block cipher, an initialization vector may be linearly added to and/or logically XORed with the first block of plain text or may be included in front of plain text prior to encryption. In a stream cipher, an initialization vector may be loaded into an internal secret state of a cipher, after which the cipher may be run a predefined number of rounds to initialize the cipher before encoding data.

As noted, embodiments presented herein are directed to generating a non-random initialization vector. As used herein, the phrase "non-random initialization vector" generally refers to any initialization vector that is generated such that the initialization vector is free from random data and/or pseudo-random data. In other words, a non-random initialization vector may be any initialization vector generated without using random and/or pseudo-random data generation as part of creating the initialization vector. In some embodiments a non-random initialization vector may include only a unique identifier of a computing system and information associated with the data to be encrypted. As discussed in greater detail below, a non-random initialization vector may also include other data.

At step 306 in FIG. 3 and as part of generating an initialization vector, one or more of the systems described herein may identify a unique identifier associated with the computing system. For example, generation module 108 may identify unique identifier 210 associated with computing device 202 in FIG. 2.

Generation module 108 may identify various types of unique identifiers associated with computing systems. For example, generation module 108 may identify a hardware identifier of a hardware device of the computing device 202. For example, generation module 108 may identify a Universally Unique Identifier (UUID) of a chipset or operating system of computing device 202, a Basic Input/Output System (BIOS) serial number, a Network Interface Card (NIC), a Media Access Control (MAC) address, a Globally Unique Identifier (GUID), and/or any other machine-dependent value for uniquely identifying a computing system and/or any hardware, firmware, peripheral device, or other component of a computing system.

In some embodiments, generation module 108 may identify a unique identifier associated with a computing system by locating an identifier assigned to the computing system by a third party. For example, generation module 108 may identify an Internet Protocol (IP) address via Dynamic Host Configuration Protocol (DHCP), may identify a GUID assigned to the computing device by third party software, may identify a serial number associated with the computing device, and/or may identify any other type of identifier assigned to the computing device by a third party.

In some embodiments, generation module 108 may compute a hash of the unique identifier associated with the computing system. Any suitable hash algorithm may be used. For example, the hash algorithm may be provided through an available cryptography library and/or may be in compliance with cryptography policies and standards, such as Federal Information Processing Standard (FIPS) 140-2 requiring Secure Hash Algorithm 1 (SHA1) or better. In some embodiments, generation module 108 may canonicalize the identifier before hashing the identifier. For example, the identifier could be converted to all lowercase without leaving whitespace. The identifier may also be canonicalized by adding whitespace and/or normalizing the identifier in any other suitable manner.

At step 308 in FIG. 3, as part of generating an initialization vector, one or more of the systems described herein may identify information associated with the data to be encrypted. For example, generation module 108 may identify information associated with data 230 on computing device 202.

Generation module 108 may identify various types of information associated with the data to be encrypted. For example, generation module 108 may identify information that indicates a location of data 230 (e.g., information that indentifies a website for which data 230 is used as a password, information that identifies a storage location of data 230, etc.) and may compute a hash of the information that indicates the location of the data. For example, generation module 108 may identify a Uniform Resource Locator (URL) associated with a website to which a password (data 230) provides access. Information associated with the data may also be part of the password itself, any information scraped from a website to which the password is entered, information indicating a type of the password (e.g., a length of the password, a security protocol associated with the password, etc.), information about a user entering the password (e.g., a name of the user, a username of the user, etc.), information assigned to the data by a third party, and/or any other information associated with the data that is to be encrypted.

At step 310 in FIG. 3, one or more of the systems described herein may generate the initialization vector by concatenating the unique identifier with the information associated with the data. For example, generation module 108 may concatenate unique identifier 210 associated with computing device 202 with identification information 220 associated with data 230 to create an initialization vector for use in encoding data 230.

Generation module 108 may use any suitable concatenation process for concatenating unique identifier 210 with identification information 220. Generation module 108 may concatenate unique identifier 210 with identification information 220 by joining strings of information from or representing unique identifier 210 and identification information 220 in any suitable way. For example, generation module 108 may join unique identifier 210 with identification information 220 by using unique identifier 210 to form a first half of the initialization vector and using identification information 220 to form a second half of the initialization vector. Alternatively, generation module 108 may join unique identifier 210 with identification information 220 by using unique identifier 210 to form a second half of the initialization vector and using identification information 220 to form a first half of the initialization vector.

In some embodiments, generation module 108 may concatenate unique identifier 210 with identification information 220 by concatenating a hash of unique identifier 210 with a hash of identification information 220. Generation module 108 may also concatenate unique identifier 210 with identification information 220 by concatenating a canonicalized hash of unique identifier 210 with a canonicalized hash of identification information 220.

If concatenating unique identifier 210 with identification information 220 would result in an initialization vector that is too long as determined by the encryption algorithm used by cipher 110, generation module 108 may shorten unique identifier 210 (or a hash of unique identifier 210) and/or may shorten identification information 220 (or a hash of identification information 220) such that the concatenation results in an initialization vector of appropriate length.

If concatenating unique identifier 210 with identification information 220 would result in an initialization vector that is too short as determined by the encryption algorithm used by cipher 110, generation module 108 may add white space and/or other data (e.g., in accordance with Public Key Cryptography Standard (PKCS) 7, in accordance with RFC 1321, etc.) to unique identifier 210 (or a hash of unique identifier 210) and/or to identification information 220 (or a hash of identification information 220) such that the concatenation results in an initialization vector of appropriate length.

At step 312 in FIG. 3, one or more of the systems described herein may encode the data using the initialization vector and the encryption key. For example, cipher 110 may encode data 230 using encryption key 122 and the initialization vector generated by generation module 108.

Cipher 110 may use any suitable algorithm to encode the data. For example, cipher 110 may apply the initialization vector to the data to create a first encoding of the data, and may apply the encryption key to the first encoding of the data to provide a second, final encoding of the data. Additionally or alternatively, the initialization vector may be used to initialize cipher 110, after which cipher 110 may use the encryption key to encode the data.

As previously discussed, cipher 110 may be a block cipher. Cipher 110 may be implemented in any suitable type of block cipher mode, including, but not limited to, Electronic Code Book (ECB), Cipher Block Chaining (CBC), Propagating Cipher-Block Chaining (PCBC), Output Feedback Mode (OFB), Integrated Counter Mode (ICM), Cipher Feedback Mode (CFB), etc. In one or more block cipher modes, cipher 110 may encode the data by linearly combining the initialization vector with a block of the data to create an initialized block of data to which the encryption key may be applied, may encode the data by XORing the initialization vector with a block of the data to create an initialized block of data, by initializing a shift register with the initialization vector before encoding data, and/or may operate in any other suitable manner. In embodiments where the cipher is a stream cipher, cipher 110 may encode the data using the initialization vector to seed the stream cipher.

Figure 4:
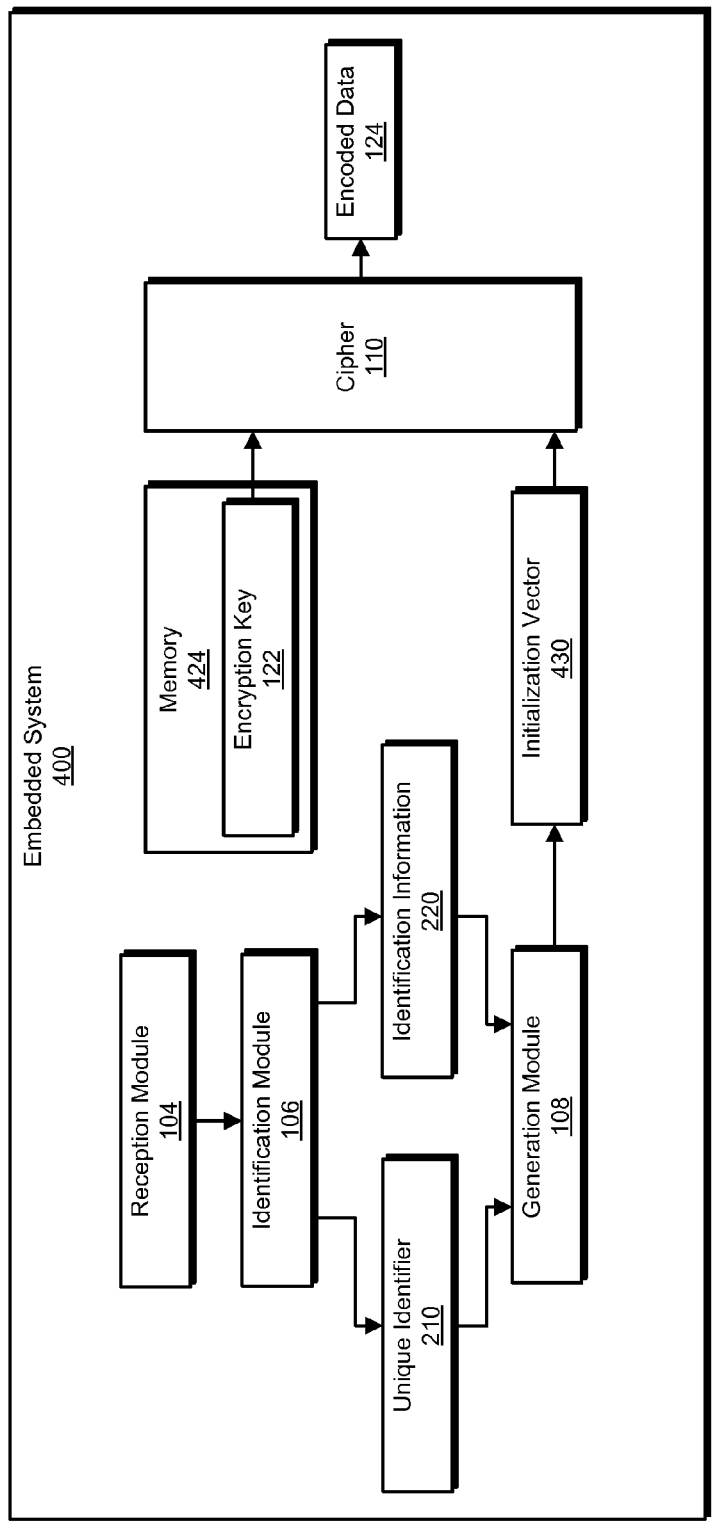
FIG. 4 is a block diagram of an exemplary embedded system on which data may be encoded.

FIG. 4 shows an exemplary embedded system 400 in which embodiments of the instant disclosure may be applied. As shown in FIG. 4, embedded system 400 may include reception module 104, which may receive a request to encode data within embedded system 400. Then, identification module 106 may identify unique identifier 210 and identification information 220, and generation module 108 may use unique identifier 210 and identification information 220 to create initialization vector 430. Cipher 110 may then receive initialization vector 430 and encryption key 122 from memory 424, and may use initialization vector 430 and encryption key 122 to create encoded data 124.

Embedded system 400 generally represents any type or form of computing system designed to perform one or more of a few dedicated and/or specific functions. Embedded system 400 may be limited to performing only the set of predefined functions. Embedded system 400 may be embedded as part of a complete device that may include hardware and/or mechanical parts, in contrast to a general purpose computer. For example, embedded system 400 may include a microcontroller and/or a digital signal processor designed to handle a particular task. Embedded system 400 may be limited by computing constraints (e.g., real-time computing constraints, memory constraints, etc.) such that embedded system 400 is incapable of generating random and/or pseudo-random data for use in initialization vectors. Thus, embodiments of the instant disclosure may provide a way for embedded systems, such as embedded system 400, to provide password security and/or other types of security for data without generating random and/or pseudo-random data.

In some embodiments, embedded system 400 may be incapable of generating random and/or pseudo-random data. In other embodiments, generating random and/or pseudo-random data on embedded system 400 may be time prohibitive (e.g., may take so long, such as tenths of a second or seconds, that it interferes with the intended use of embedded system 400).

For example, embedded system 400 may not have the processing power to efficiently generate random and/or pseudo-random data. In other embodiments, embedded system 400 may not have hardware that can be used to generate random and/or pseudo-random data (e.g., a hard disk drive whose head movement timings may be used to generate pseudo-random data).

As another example, the space available in memory 424 of embedded system 400 may be limited such that when encryption key 122 is stored in memory 424, encryption key 122 may consume a non-trivial amount of memory within embedded system 400. In other words, storing encryption key 122 in memory 424 may have an adverse impact on the performance of embedded system 400 and/or may consume a significant percentage (e.g., 10 percent or more) of random access memory of embedded system 400. Thus, system designers may not be able to store a large number of encryption keys in the memory of an embedded system. Embodiments of the instant disclosure may address this issue by enabling the reuse of a single key (thereby eliminating or significantly reducing key management and the memory consumed by keys) in combination with machine- and data-specific initialization vectors.

Embodiments of the instant disclosure may also provide various other features and advantages. As noted, embodiments of the instant disclosure may enable a computing system to use the same encryption key on a variety of passwords and/or other types of data. For example, continuing with the process described in FIG. 3, an additional request to encode additional data using cipher 110 may be received. In response to receiving such a request, identification module 106 may identify the encryption key (e.g., encryption key 122) used by cipher 110 to encode the original data (e.g., a first password) and may use the same encryption key to encode the additional data (e.g., a second password). Generation module 108 may then generate an additional non-random initialization vector for cipher 110 by identifying a unique identifier of a computing system (e.g., unique identifier 210 and/or any other suitable unique identifier), identifying information associated with the additional data, and concatenating the two. The additional data may be encoded using the additional non-random initialization vector and the encryption key.

Creating initialization vectors in the manner describe above may prevent an attacker from using the initialization vector to access the otherwise protected data. Thus, embodiments of the instant disclosure may reduce or eliminate key management and provide adequate security while reducing development costs and time. For example, on platforms that offer unique, protected encryption keys, such as a WINDOWS Data Protection Application Programming Interface (DPAPI), applications using embodiments of the instant disclosure may not need to perform any key management at all. Furthermore, embodiments of the instant disclosure may be used in conjunction with encryption libraries, such as Pretty Good Privacy (PGP).

As described above, embodiments of the instant disclosure may be used as part of a key management component to protect numerous items of sensitive data (e.g., passwords) using a single key protection key with unique initialization vectors. Furthermore, in some embodiments the initialization vectors may be discarded and regenerated for use in decoding the data. Since the initialization vectors are created using information readily available to generation module 108 (i.e., unique identifiers of computing systems and information associated with the encrypted data), initialization vectors may be easily re-created using the same processes described in FIG. 3, and data may be decoded using the re-created initialization vectors with the same processes described in FIG. 3.

Figure 5:
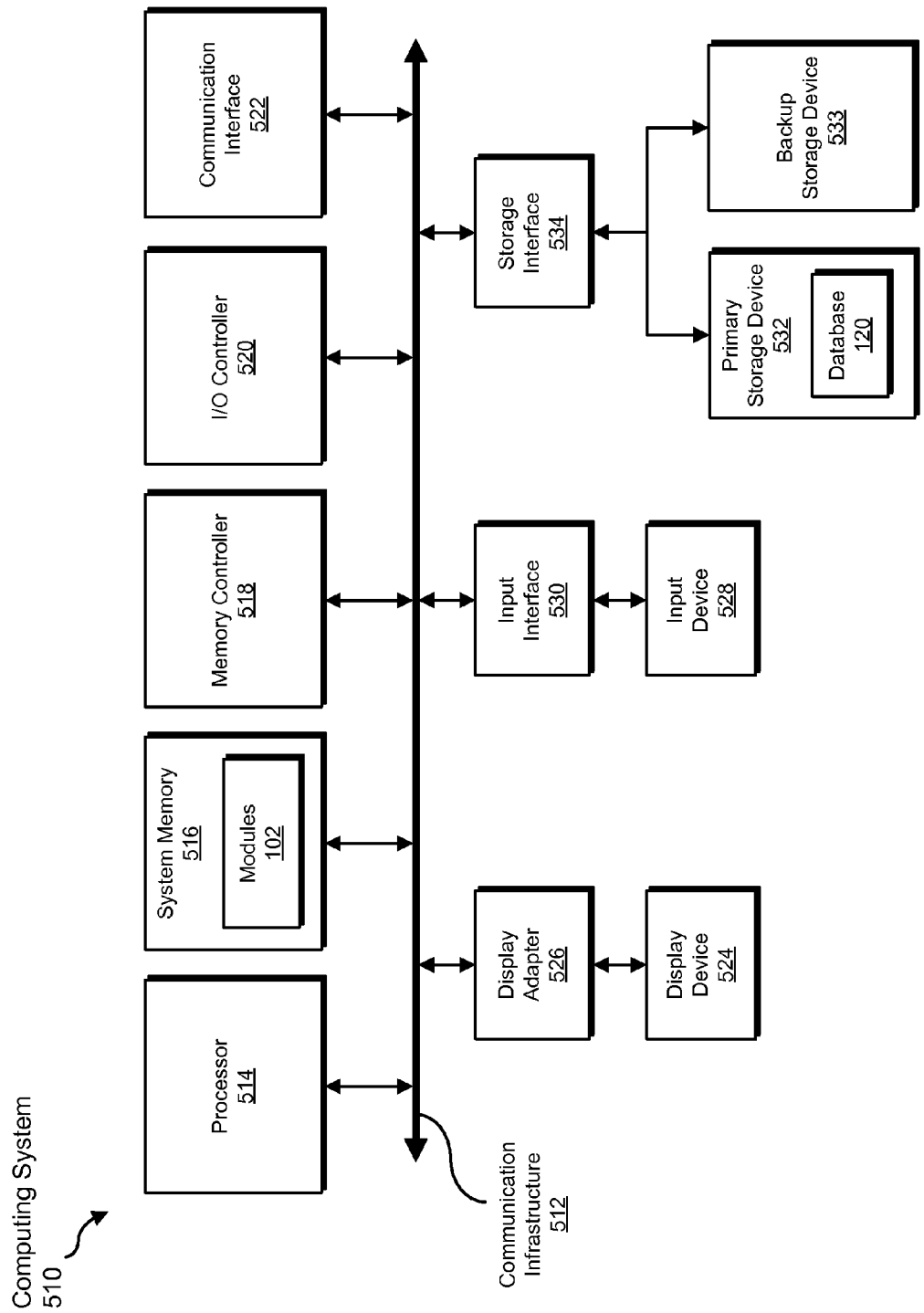
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the receiving, identifying, generating, concatenating, encoding, locating, computing, applying, storing, discarding, and recreating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532 and/or any other storage component of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
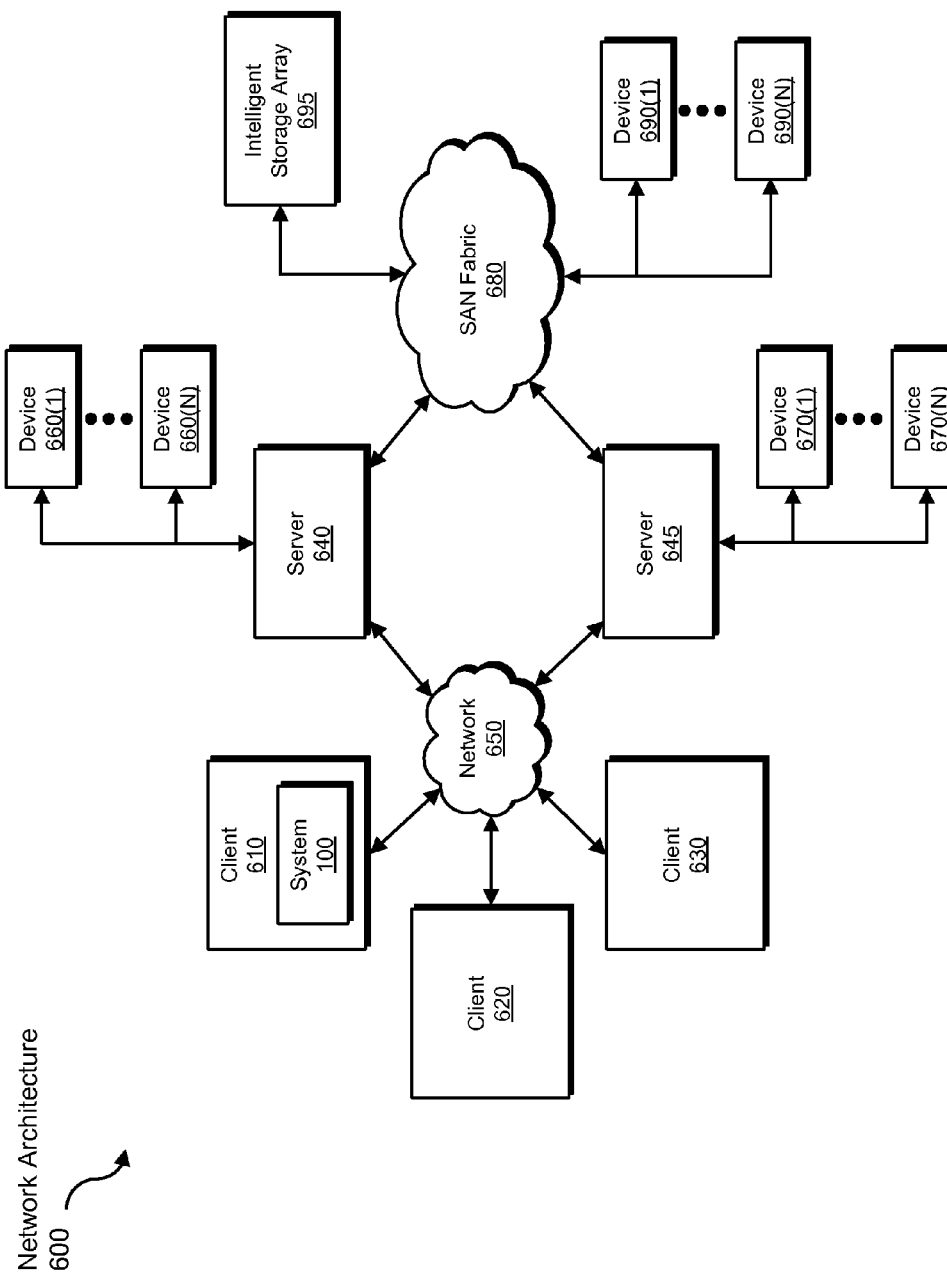
FIG. 6 is a block diagram of an exemplary computing network capable of implementing one or more of the embodiments described and/or illustrated herein.

FIG. 6 is a block diagram of an exemplary network architecture 600 in which clients 610, 620, and 630 and servers 640 and 645 may be coupled to a network 650. As detailed above, all or a portion of network architecture 600 may perform and/or be a means for performing, either alone or in combination with other elements, one or more of the receiving, identifying, generating, concatenating, encoding, locating, computing, applying, storing, discarding, and recreating steps disclosed herein. All or a portion of network architecture 600 may also be used to perform and/or be a means for performing other steps and features set forth in the instant disclosure.

Clients 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, clients 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between clients 610, 620, and 630 and storage devices 690(1)-(N) and/or intelligent storage array 695 in such a manner that storage devices 690(1)-(N) and intelligent array 695 appear as locally attached devices to clients 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client 610, 620, and 630 and network 650. Clients 610, 620, and 630 may be able to access information on server 640 or 645 using, for example, a web browser or other client software. Such software may allow clients 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to clients 610, 620, and 630 over network 650.

As detailed above, computing system 510 and/or one or more components of network architecture 600 may perform and/or be a means for performing, either alone or in combination with other elements, one or more steps of an exemplary method for encoding data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform memory written to by a cipher by providing a non-random initialization vector to the cipher.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for encoding sensitive information, at least a portion of the method being performed by a computing device comprising at least one processor, the method comprising:
    receiving, on the computing device, a request to encode the sensitive information using a cipher;
    identifying an encryption key to be used by the cipher to encode the sensitive information;
    generating, on the computing device, a unique non-random initialization vector for the sensitive information that is to be used by the cipher to encode the sensitive information by:
    obtaining a unique identifier associated with the computing device;
    obtaining a set of information that uniquely identifies the sensitive information;
    concatenating the unique identifier with the set of information that uniquely identifies the sensitive information to create the unique non-random initialization vector for the sensitive information;
    encoding the sensitive information with the cipher using the unique non-random initialization vector and the encryption key;
    discarding, after encoding the sensitive information:
    the unique non-random initialization vector;
    the set of information that uniquely identifies the sensitive information;
    after discarding the unique non-random initialization vector and the set of information that uniquely identifies the sensitive information:
    receiving, on the computing device, a request to decode the sensitive information on the computing device;
    regenerating, on the computing device, the unique non-random initialization vector using the same process used to generate the unique non-random initialization vector;
    decoding, on the computing device, the sensitive information using the regenerated unique non-random initialization vector and the encryption key.

2. The computer-implemented method of claim 1, wherein:
    obtaining the unique identifier associated with the computing device comprises at least one of:
    locating a hardware identifier associated with the computing device and computing a hardware identifier hash of the hardware identifier, the hardware identifier hash comprising the unique identifier associated with the computing device;
    locating an identifier assigned to the computing device by a third party and computing a third party hash of the identifier assigned to the computing device by the third party, the third party hash comprising the unique identifier associated with the computing device.

3. The computer-implemented method of claim 1, wherein:
    obtaining the set of information that uniquely identifies the sensitive information comprises:
    identifying information that indicates a location of the sensitive information;
    computing a hash of the information that indicates the location of the sensitive information, the hash comprising the set of information that uniquely identifies the sensitive information.

4. The computer-implemented method of claim 1, wherein the set of information that uniquely identifies the sensitive information:
    identifies the sensitive information at the computing device;
    does not identify any other sensitive information at the computing device.

5. The computer-implemented method of claim 1, wherein encoding the sensitive information with the cipher comprises:
    applying the unique non-random initialization vector to the sensitive information to create a first encoding of the sensitive information;
    applying a key to the first encoding of the sensitive information to provide a second encoding of the sensitive information.

6. The computer-implemented method of claim 1, wherein the set of information that uniquely identifies the sensitive information comprises a set of information that is unique at the computing device.

7. The computer-implemented method of claim 1, wherein:
    the cipher comprises a stream cipher;
    encoding the sensitive information with the cipher using the unique non-random initialization vector comprises seeding the stream cipher with the unique non-random initialization vector.

8. The computer-implemented method of claim 1, wherein:
    the computing device comprises an embedded computing device that is configured to perform a set of predefined dedicated tasks.

9. The computer-implemented method of claim 8, wherein:
    the embedded computing device is configured with computing constraints such that the embedded computing device is incapable of generating random and/or pseudo-random data for use in initialization vectors.

10. The computer-implemented method of claim 8, wherein:
the embedded computing device is configured with computing constraints such that generating random and/or pseudo-random data on the embedded computing device is time prohibitive.

11. The computer-implemented method of claim 1, wherein:
the sensitive information comprises a security credential;
the set of information that uniquely identifies the sensitive information comprises a uniform resource locator associated with the security credential.

12. The computer-implemented method of claim 1, further comprising:
receiving a request to encode additional sensitive information using the cipher;
identifying the encryption key to be used by the cipher to encode the additional sensitive information;
generating, on the computing device, an additional unique non-random initialization vector for the additional sensitive information that is to be used by the cipher to encode the additional sensitive information by:
obtaining the unique identifier associated with the computing device;
obtaining a set of information that uniquely identifies the additional sensitive information;
concatenating the unique identifier with the set of information associated with the additional sensitive information to create the additional unique non-random initialization vector;
encoding the additional sensitive information with the cipher using the additional unique non-random initialization vector and the encryption key.

13. The computer-implemented method of claim 1, wherein regenerating the unique non-random initialization vector comprises:
reobtaining the unique identifier associated with the computing device;
reobtaining the set of information that uniquely identifies the sensitive information;
concatenating the unique identifier with the set of information that uniquely identifies the sensitive information to regenerate the unique non-random initialization vector.

14. A system for encoding sensitive information, the system comprising:
a reception module programmed to receive, on a computing device, a request to encode the sensitive information using a cipher;
an identification module programmed to identify an encryption key to be used by the cipher to encode the sensitive information;
a generation module programmed to generate, on the computing device, a unique non-random initialization vector for the sensitive information that is to be used by the cipher to encode the sensitive information by:
obtaining a unique identifier associated with the computing device;
obtaining a set of information that uniquely identifies the sensitive information;
concatenating the unique identifier with the set of information that uniquely identifies the sensitive information to create the unique non-random initialization vector for the sensitive information;

the cipher, wherein the cipher is programmed to encode the sensitive information using the unique non-random initialization vector and the encryption key;
the generation module is programmed to discard, after the sensitive information has been encoded:
the unique non-random initialization vector;
the set of information that uniquely identifies the sensitive information;
the reception module is programmed to receive, on the computing device and after the unique non-random initialization vector and the set of information that uniquely identifies the sensitive information have been discarded, a request to decode the sensitive information on the computing device;
the generation module is programmed to regenerate, on the computing device and in response to the request to decode the sensitive information having been received, the unique non-random initialization vector using the same process used to generate the unique non-random initialization vector;
the cipher is programmed to decode, on the computing device, the sensitive information using the regenerated unique non-random initialization vector and the encryption key;
at least one hardware processor configured to execute the reception module, the identification module, the generation module, and the cipher.

15. The system of claim 14, wherein:
the identifier associated with the computing device comprises at least one of:
a globally unique identifier that identifies a hardware device;
a basic input-output system serial number;
a network interface card address;
the set of information that uniquely identifies the sensitive information comprises at least one of:
a pointer to the sensitive information;
a uniform resource locator associated with the sensitive information;
a value assigned to the sensitive information by a third party.

16. The system of claim 14, wherein the unique non-random initialization vector is generated such that:
the unique non-random initialization vector can be reproduced using only the identifier associated with the computing device and the set of information that uniquely identifies the sensitive information;
the unique non-random initialization vector is free from random data and pseudo random data.

17. The system of claim 14, wherein:
the computing device comprises an embedded computing device that is configured to perform only a set of predefined dedicated functions.

18. The system of claim 17, wherein:
the embedded computing device is configured with computing constraints such that the embedded computing device is incapable of generating random and/or pseudo-random data for use in initialization vectors and/or generating random and/or pseudo-random data on the embedded computing device is time prohibitive.

19. The system of claim 14, wherein:
the sensitive information comprises a security credential;
the set of information that uniquely identifies the sensitive information comprises a uniform resource locator associated with the security credential.

20. A non-transitory computer-readable-storage medium comprising one or more computer-executable instructions that, when executed by at least one processor of a computing device, cause the computing device to:
- receive, on the computing device, a request to encode sensitive information using a cipher;
- identify an encryption key to be used by the cipher to encode the sensitive information;
- generate, on the computing device, a unique non-random initialization vector for the sensitive information that is to be used by the cipher to encode the sensitive information by:
  - obtaining a unique identifier associated with the computing device;
  - obtaining a set of information that uniquely identifies the sensitive information;
  - concatenating the unique identifier with the set of information that uniquely identifies the sensitive information to create the unique non-random initialization vector for the sensitive information;
- encode the sensitive information with the cipher using the unique non-random initialization vector and the encryption key;
- discard, after encoding the sensitive information:
- the unique non-random initialization vector;
- the set of information that uniquely identifies the sensitive information;
- after discarding the unique non-random initialization vector and the set of information that uniquely identifies the sensitive information:
- receive, on the computing device, a request to decode the sensitive information on the computing device;
- regenerate, on the computing device, the unique non-random initialization vector using the same process used to generate the unique non-random initialization vector;
- decode, on the computing device, the sensitive information using the regenerated unique non-random initialization vector and the encryption key.

* * * * *